United States Patent

[11] 3,589,186

| [72] | Inventors | Andre Bourg<br>Chatenay-Malabry;<br>Philippe Tempe, Cormeilles En Parisis, both of, France |
|---|---|---|
| [21] | Appl. No. | 887,874 |
| [22] | Filed | Dec. 24, 1969 |
| [45] | Patented | June 29, 1971 |
| [73] | Assignee | Societe D'Instrumentation Schlumberger<br>Paris, France |
| [32] | Priority | Dec. 30, 1968 |
| [33] | | France |
| [31] | | 181,570 |

[54] ELECTROMAGNETIC FLOW METER FOR CONDUCTIVE FLUIDS HAVING MATCHED MAGNETIC AND ELECTRICAL SYSTEMS
16 Claims, 12 Drawing Figs.

| [52] | U.S. Cl. | 73/194 EM |
| [51] | Int. Cl. | G01p 5/08 |
| [50] | Field of Search | 73/194 EM |

[56] References Cited

UNITED STATES PATENTS

| 2,896,451 | 7/1959 | Rinia | 73/194 |
| 3,373,608 | 3/1968 | Ketelsen | 73/194 |

FOREIGN PATENTS

| 1,411,466 | 8/1965 | France | 73/194 |
| 1,521,859 | 3/1968 | France | 73/194 |
| 1,095,915 | 12/1967 | Great Britain | 73/194 |

*Primary Examiner*—Charles A. Ruehl
*Attorneys*—William R. Sherman, Stewart F. Moore, Jerry M. Presson and Leonard R. Fellen ABSTRACT: An electromagnetic flow meter for measuring the total flow of a conductive fluid through a pipe includes two current-carrying coils mounted exteriorly of the pipe and positioned diametrically opposite one another to generate a magnetic field in a plane transverse to the direction of fluid flow. The plane includes two electrodes mounted opposite each other on the internal wall of the pipe. The respective shape and dimensions of the electrodes and coils are matched such that at each point in an electrode plane the elemental electrode voltage attributable to that point has a substantially constant value and is a function of the weighting factor of the electrodes and the magnetic field density. In accordance with one embodiment, the electrodes cover a relatively large portion surface of the pipe wall whereas in accordance with another embodiment an array of smaller sized electrodes are utilized.

INVENTORS
ANDRE BOURG
PHILIPPE TEMPE $W_Y B_X - W_X B_Y = W_Y B_X - 1$

ELECTROMAGNETIC FLOW METER FOR CONDUCTIVE FLUIDS HAVING MATCHED MAGNETIC AND ELECTRICAL SYSTEMS

This invention relates to electromagnetic flow meters of the type wherein a pair of electrodes defining an electrode plane transverse to the direction of fluid flow receive an electrical potential which is magnetically induced in an electrically conductive fluid flowing through that plane. The potential received at the electrode has a magnitude which corresponds to the total flow of the fluid through the plane.

Known prior art flow meters of the type under consideration typically create a uniform magnetic field transverse to the fluid flow by applying an alternating current to two diametrically opposed coils and utilize two diametrically opposed point-electrodes as the means for picking up electrical potential induced in the fluid. The two electrodes are contained in an electrode plane which is typically perpendicular to the direction of fluid flow in a pipe or conduit.

These flow meters suffer several disadvantages of import and a particularly serious disadvantage is that for such meters to provide measurements of acceptable accuracy, it is necessary that there be a uniform magnetic field at right angles to the electrodes and that the profile of the flow velocities of the fluid be as symmetrical as possible with respect to the flow axis.

However, as a practical matter, the various elementary fluid volumes in the electrode plane do not have the same effect in establishing the induced signal, but are weighted in accordance with a certain weight function, with the elementary volumes closer to the electrodes having greater weight function than elementary volumes further from the electrodes. This explains why, in flow meters of conventional type, it is necessary to stabilize the flow prior to conducting the measurement so as to reestablish axial symmetry and hence a symmetrical velocity profile to the flow of the fluid past the electrodes. In practice, this is often accomplished by the expedient of placing a straight piece of pipe upstream of the apparatus, with a length measuring up to 10 times the diameter of the pipe. However, this expedient has manifest disadvantage when pipes of large diameter are required.

Another disadvantage of import of conventional flow meters of the type under present consideration is that in order to obtain a uniform magnetic field, such meters require coil structures of rather complex design which makes the fabrication of the coil assembly a relatively complicated and expensive proposition.

In an electromagnetic flow meter of the instant type, the voltage E picked up between two measurement electrodes defining an electrode plane may be expressed by the general equation:

$$E = \int\int\int \begin{vmatrix} W_x & W_y & W_z \\ B_x & B_y & B_z \\ V_x & V_y & V_z \end{vmatrix} dx\,dy\,dz$$

where $B_x\, B_y\, B_z$ are the components of the magnetic field density B in the directions of OX, the axis of the electrodes; OY, the axis of the coils and OZ, the axis of the flow;

$V_x\, V_y\, V_z$ are the components of the velocity V in the directions of OX, OY and OZ; and $W_x\, W_y\, W_z$ are the components of the pseudo weighting vector W in the directions of OX, OY and OZ. With the average liquid velocity $V_x = V_y = 0$, the above equation reduces to:

$$E = \int\int\int (W_y B_x - W_x B_y) V_z\, dx\,dy\,dz.$$

The weight functions $W_x$ and $W_y$ that are obtained with conventional, substantially point electrodes disposed in a pipe of circular cross section are given in FIGS. 1 and 2. These are two orthogonal families of curves having large gradients of weight function variation in the area of the electrodes.

It bears mentioning that the determination of the components $W_x$ and $W_y$ of the resultant weight vector W can be made by applying the principle of reciprocity; that is to say, a constant difference of potential is applied between the measurement electrodes, and the gradients $W_x = \delta W/\delta x$ and $W_y = \delta W/\delta$ of the vector W thus created are determined either experimentally or analytically (usually by means of a computer) at each point in a plane transverse to the flow of the fluid.

It has been proposed by others working in the art to generate a magnetic field whose principal components $B_y$ are such that the product $W_x\, B_y$ is constant in each plane transverse to the flow in the flow meter. The measurement voltage E thus produced then would be independent of axial dissymmetries in flow velocity. If the product $W_x\, B_y$ is made constant, two families of identical curves $W_x$ and $B_y$ are obtained, the values assigned to homologous curves of the two families being reciprocals of each other. At each point the divergence of the field B is zero i.e. $\delta B_x/\delta x + \delta B_y/\delta y + \delta B_z/\delta z = 0$. In the geometrical center of the fluid-conducting pipe the term $\delta B_z/\delta z$ is zero, so that $\delta B_x/\delta x = \delta_y/\delta y$.

In the case in which a magnetic field B is generated in a circular pipe such that $W_x B_y = 1$ with $B_y = 1$ at the center, FIG. 2, the chart of FIG. 3 is obtained for the component $B_x$. Under these conditions the term $W_y\, B_x$, which can be deduced from the charts shown in FIGS. 1 and 3, is shown in FIG. 4. From the chart of $W_y\, B_x$ is immediately obtained the chart of the expression $(W_y B_x - W_x B_y)$ which determines the amplitude of the signal picked up at the electrodes $E_1$ and $E_2$. As $W_x B_y$ was set equal to 1, the preceding expression becomes $W_y B_x - 1$, and the chart which shows the space variations of this function is reproduced in FIG. 5. Such a chart illustrates the magnitude of the error that is introduced when an electromagnetic flow meter is constructed with essentially point electrodes and with means for generating a nonuniform magnetic field whose principal component $B_y$ is simply the reciprocal of the space weight factor $W_x$.

It can be seen from the chart of FIG. 5 that in each quadrant about a third of the total cross section of the pipe (the area situated in the concavity of the line marked 0.9) through which a fluid is flowing at a given speed, generates a measurement signal at least 10 percent lower than the signal provided by the fluid flowing at the same speed in the rest of the cross section of the pipe, and the error becomes greater than 25 percent in a region representing about a quarter of the total cross section.

Moreover, it can be seen that with conventional point electrodes, by making the product $W_x\, B_y$ constant, it is not possible to obtain a measurement which is independent of axial dissymmetries in the fluid flow in a pipe without appropriately compensating for such dissymmetries.

The object of this invention is to provide an electromagnetic flow meter for providing precise measurements of the fluid flow regardless of axial dissymmetries in the velocity profile of such flow.

Briefly, an electromagnetic flow meter, constructed in accordance with this invention, is characterized by the two large-area electrodes and a nonuniform magnetic field engendered by coils with shapes and dimensions that are respectively matched to those of the electrodes, or vice versa. Applicants have calculated on a computer and experimentally verified that it is possible to determine, for a pipe of given size and shape, from the shape of the electrodes, the conjugated shape of the inductor coils such that at any point in each cross section of liquid flowing in the electrode plane, the value of the magnetic field is the reciprocal function of the weight function corresponding to the electrodes. The families of curves representing the weight functions provided by such electrodes have relatively small gradients of weight function variation in the flow cross section or elementary liquid "slice" which includes the electrodes and therefore it is possible to integrate the velocity of a fluid flowing through a length of conduit essentially independently of the instantaneous distribution of flow velocities within the magnetic field.

According to a complementary aspect of this invention, the shape, dimensions and spacing of the coils are determined as a function of the shape and dimensions of the electrodes and of the pipe such that the weight-density expression $(W_y B_x - W_x B_y)$ is as constant as possible in each plane perpendicular to the flow axis of the fluid.

Due to this complementary characteristic, not only is the term $W_y B_x$ minimized, but also the overall coefficient of proportionality that relates E and V is maintained constant.

The invention and its advantages, as well as others of its particular features, will now be described by way of nonlimitative examples, with references to the attached drawings in which.

Figure 9:
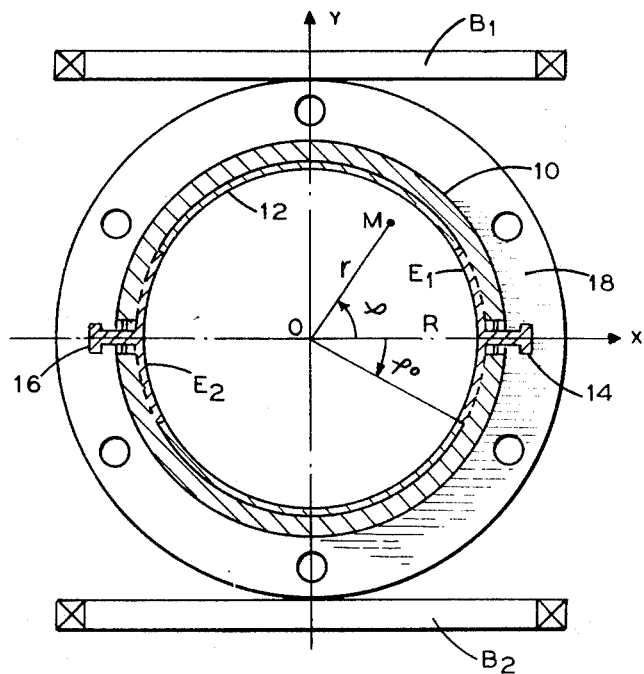
FIG. 9 is a cross section of one electrode embodiment of a typical flow meter constructed in accordance with the invention.
Figure 10:
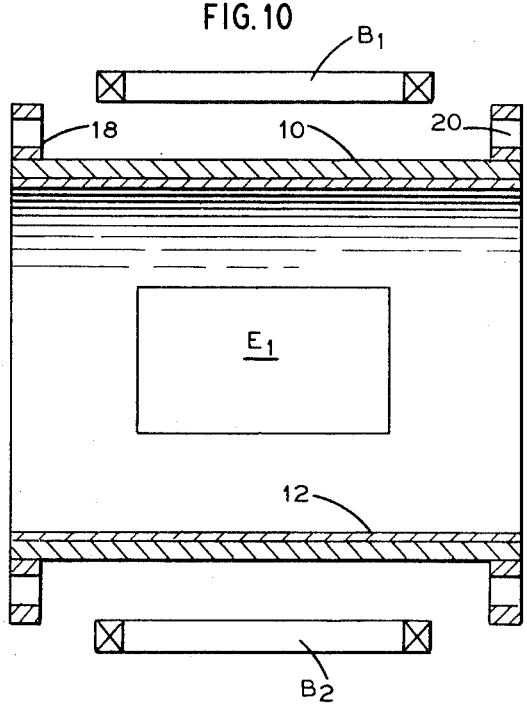
FIG. 10 is an axial section along line II-II of the flow meter in FIG. 9.

Referring to FIGS. 9 and 10, one embodiment of a flow meter constructed in accordance with the instant invention includes a fluid conveying conduit 10, and specifically a length of cylindrical pipe, having an average radius R and an assumed length of 3R. The conduit 10 may be made of nonmagnetic material, such as stainless steel, covered inside with a layer of insulation 12. Two coupling flanges 18 and 20 may be formed on the conduit ends. On the inner surface of the insulating layer 12, two diametrically opposite electrodes $E_1$ and $E_2$ of cylindrical sector shape, are positioned and fixed. Each electrode subtends an angle $\Phi$ taken with respect to the geometrical center of the conduit 10 and each respectively connected to an external terminal 14 and 16 suitably insulated from the conduit 10. Outside the conduit and mounted on insulating supports (not shown), are two symmetrically disposed electrical coils $B_1$ and $B_2$ of overall rectangular shape. The axis OY of coils $B_1$ and $B_2$ is perpendicular to the axis of symmetry OX of electrodes $E_1$ and $E_2$. The coils $B_1$ and $B_2$ produce, at any point M having coordinates $x$ and $y$ located at a distance $r$ from the center 0 of the pipe and the angle XOM=$\Phi$, a magnetic field with components $B_x$ and $B_y$.

By terming $W_x$ and $W_y$ the weight functions applied to $B_x$ and $B_y$, the potential difference E induced between the two electrodes $E_1$ and $E_2$, under the effect of a liquid flowing in a circular cross section S, is given by the formula:

$$E = \int \int_S (W_y B_x - W_x B_y) \cdot V(x, y) \cdot dx dy$$

where $V(x, y)$ is the axial speed of the liquid at M, with $$W_y = \frac{1}{\sin \varphi_0} \sum_{p=0}^{p=\infty} \left(\frac{r}{R}\right)^{2p} \frac{\sin (2p+1)\varphi_0}{2p+1} \cdot \sin 2p\varphi$$

$$W_x = \frac{1}{\sin \varphi_0} \sum_{p=0}^{p=\infty} \left(\frac{r}{R}\right)^{2p} \frac{\sin (2p+1)\varphi_0}{2p+1} \cdot \cos 2p\varphi$$

Figure 1:
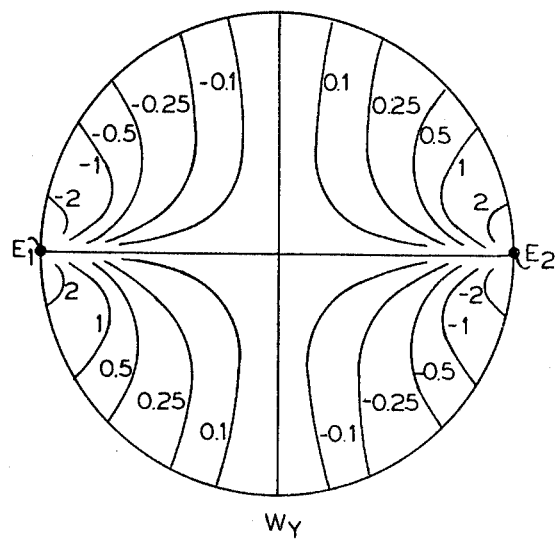
FIGS. 1 and 2 show the charts of the components of the weight pseudovector W obtained with substantially point electrodes disposed in a pipe of circular cross section.
Figure 2:
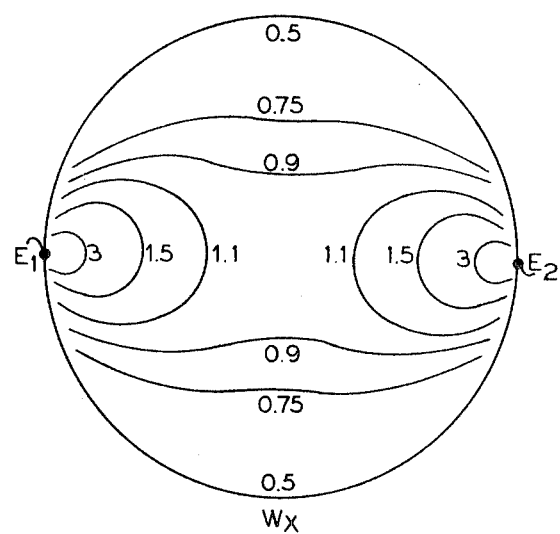
Figure 3:
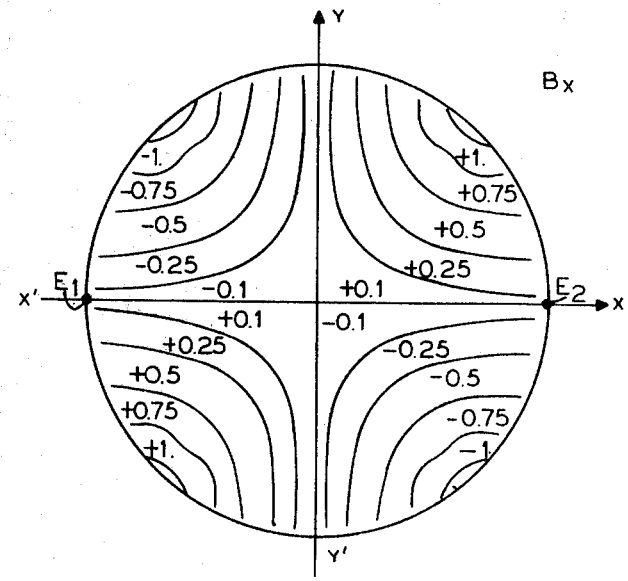
FIGS. 3 and 4 show the charts of the terms $B_x$ and $W_y B_x$ that are obtained with substantially point electrodes when the term $W_x B_y = 1$.
Figure 4:
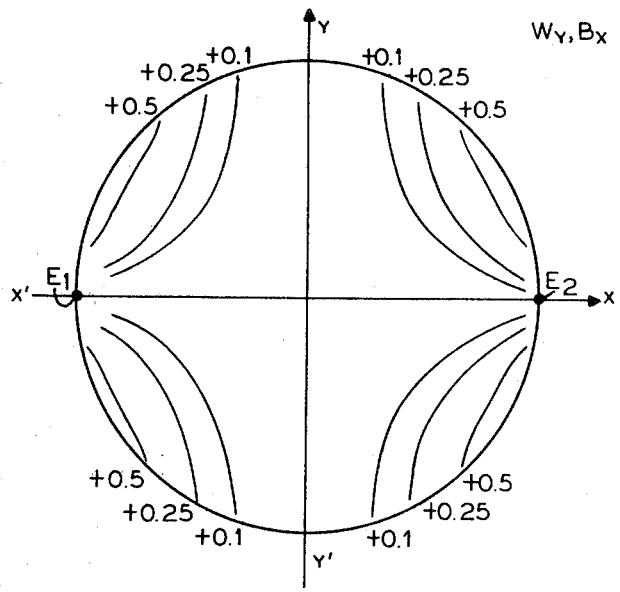
Figure 5:
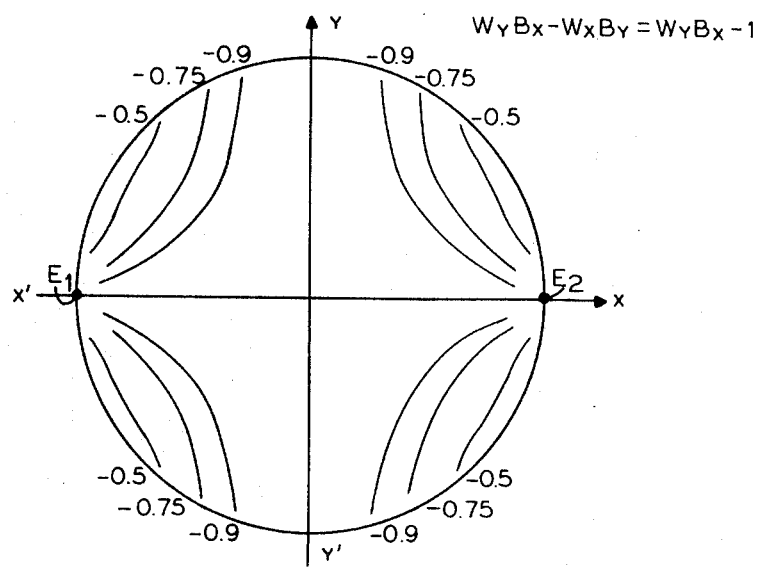
FIG. 5 is the chart of the expression $W_y B_x - W_x B_y$ that is obtained under the same conditions.
Figure 6:
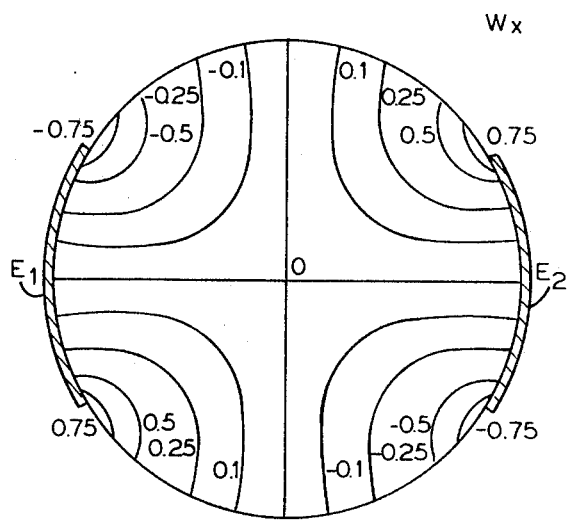
FIGS. 6 and 7 show the charts of the components of the pseudo weight vector W obtained with electrodes having an angular width of 60°.
Figure 7:
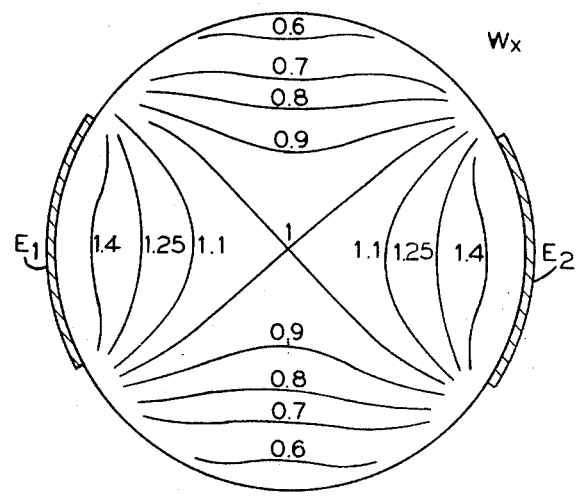

In the above example, wherein the conduit was assumed to have a radius of R and a length 3R, the functions $W_x$ and $W_y$ shown in FIGS. 6 and 7 could be provided by electrodes having an angle $\Phi$ of 60°.

As can be seen in FIGS. 6 and 7 the variations of the terms $W_x$ and $W_y$ are relatively small, which leads to flux density components $B_x$ and $B_y$ of the magnetic field that vary slightly. Moreover, the values assigned to the curves $W_y$ are small, which makes the unwanted weight-density term $W_y B_x$ small with respect to the principal weight density term $W_x B_y$. Under these conditions it becomes possible to give the principal term $W_x B_y$ a value which is approximately constant and not appreciably different from the value of the weight density expression $(W_y B_x = W_x B_y)$.

For a given transverse plane or slice of fluid in the electrode plane, this invention makes provision to render constant the factor $(W_y B_x = W_x B_y)$ under the double integral and hence in the electrode plane; the value of this factor varying, of course, from one slice of differential size to the next.

To illustrate the procedure whereby the coil and electrode shapes and dimensions are matched to achieve this end, it will be assumed that the angle subtended by each electrode $E_1$ and $E_2$ on each side of axis OX is 30° and that the length of each electrode along the direction of fluid flow is 1.5 R, where R is average radius of the conduit. It will also be assumed that it is desired or required each coil be of simple, planer, rectangular shape. With these assumptions the criterion that $(W_y B_x = W_x B_y)$ be constant is satisfied by two diametrically-opposed coils having a width dimension taken along the axis of the conduit of 2 R, a length dimension of 2.5 R and a spacing between coils of 3 R.

Figure 8:
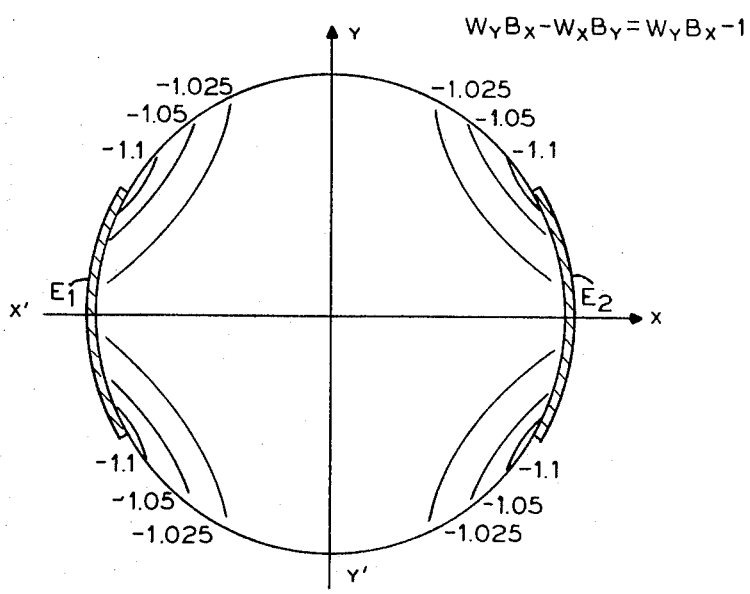
FIG. 8 shows the chart of the expression $W_y B_x - W_x B_y$ that is obtained with the above large-area electrodes of FIG. 6 and 7.

In this example, the expression $(W_y B_x - W_x B_y)$ corresponding to each elementary fluid slice in the electrode plane, is practically constant and has the largest value compatible with the smallest electrode size, FIG. 8. As a result, the length of the flow measuring section is less than 3 times the radius of the pipe and this reduction in length is of significant advantage. Another advantage is the possibility of obviating the need for long straight lengths of piping or other flow stabilizer means upstream of the flow meter, thereby making it possible to place the meter immediately downstream of a bend, a valve or any other element that could disturb the velocity profile.

It is evident that the relative dimensions given hereabove have been given as a nonlimitative example. In the case where, for example, as a result of a large relative thickness of the conduit of a flow meter designed to withstand high pressure, the relative spacing of the coils is increased, the angle subtended by the cylindrical sectors forming the electrodes will also be increased. Similarly, the shapes of the pipe cross section, the electrodes and the coils, can be different from those described. Any shape of electrode whose development in a plane is a simple surface capable of being easily defined, for example, a circle, ellipse or rectangle is suitable. The conjugated shape of the coils and their relative spacing can then be determined by calculations which may be readily performed by a computer, as a function of the shape of the electrodes and the cross section of the piping, which cross section need not, of course, be circular.

Another advantage of the flow meter constructed in accordance with the principles of the present invention is that electrodes $E_1$ and $E_2$, of relatively large surface areas, have internal electrical impedances considerably lower than that of conventional flow meter electrodes. The result is a considerable reduction in the sensitivity to unwanted signals, both electrical and magnetic.

Figure 11:
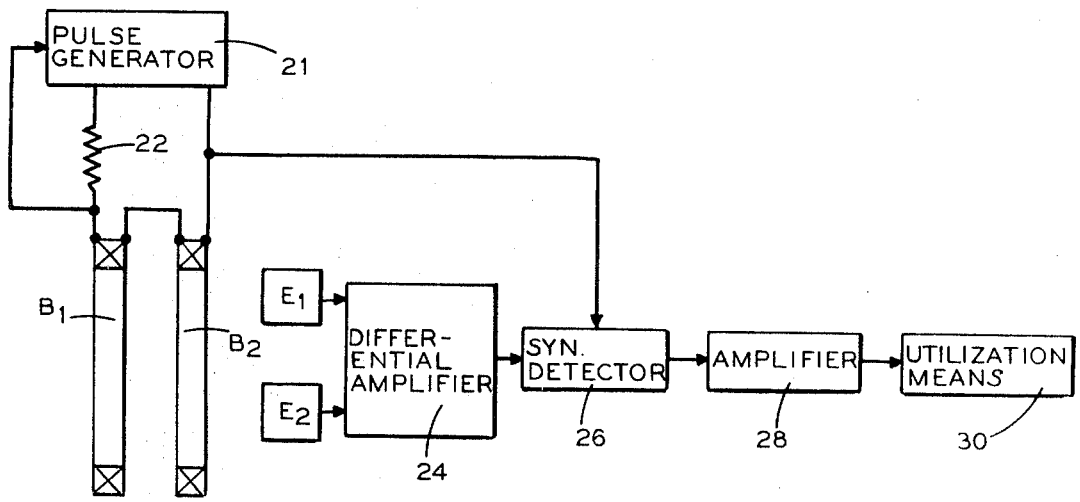
FIG. 11 is a schematic diagram of the electronic circuits associated with the flow meter in accordance with the invention.

With reference to FIG. 11, the electronic circuit associated with the instant flow meter comprises a generator 21 delivering an electrical current of constant amplitude and of frequency of, for instance, 30 Hz. to the two coils $B_1$ and $B_2$. A resistor 22, in series with the coils, provides a voltage proportional to the supply current. This voltage makes it easy to stabilize the amplitude of the supply current, whereby the measurement is more independent of variations in the amplitude and frequency of the output voltage of the generator 21 and of the electric resistance of the coils $B_1$ and $B_2$.

Electrodes $E_1$ and $E_2$ of the flow meter supply a differential amplifier 24 having a narrow pass band centered on the predominant frequency of the supply current. A synchronous detector 26 supplied, firstly, by source 21 and secondly, by amplifier 24, is connected to the input of an amplifier 28. The amplifier 28 is followed by a suitable utilization device 30 such as a readout, recorder or safety apparatus.

The frequency of the generator 21 may have any suitable value, but inasmuch as a frequency of 30 Hz. avoids direct current disturbances, especially stray currents and bias currents, and AC signal disturbances, especially line frequency and its harmonics, it constitutes at least one appropriate frequency for many applications of the instant flow meter.

The synchronous detection eliminates unwanted signals of line frequency and also the quadrature signal directly induced by the coils in the electrodes. In this manner, a power of a few tens of watts is sufficient to supply the flow meter coils whose cross sections have diameters of a few tenths of a centimeter.

In the case of the measurement of flows of fluids transporting effluents, the electrodes may become dirty after relatively short periods of service; the cleaning of the electrodes necessitates their removal, which causes a considerable loss of time.

Figure 12:
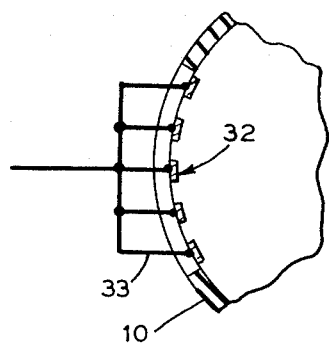
FIG. 12 is a partial cross-sectional view of another embodiment of the instant invention illustrating an array of relatively smaller sized electrodes.

FIG. 12 illustrates another embodiment of this invention wherein in lieu of each large electrode $E_1$ or $E_2$ there is an array of plural closely spaced-apart electrodes 32 suitably electrically insulated from the conduit 10. Each electrode may be of relatively small surface area and hence in this embodiment conventional point electrodes may be utilized. Alternatively, the electrodes may be formed as discrete electrically conductive, elongated or striplike segments disposed parallel or perpendicular to the direction of fluid flow. These electrodes are also disposed on the opposed internal wall portions of the conduit such that the factor $(W_y B_x - W_x B_y)$ is constant. The electrodes forming each of the opposing electrode arrays 32 are electrically connected in parallel such that two circuits, corresponding to the two output circuits available with the two large-sized electrodes $E_1$ and $E_2$, are similarly available to supply signals to the inputs of the differential amplifier 24.

In order to facilitate the removal of the electrodes 32 from the internal wall of the conduit 10, corresponding wall portions of the conduit 10 may be composed of an insulative material and the individual electrodes may be threadily connectable by way of individual electrical connectors 33 mounted in transverse apertures in the conduit wall. Electrical leads 34 may be individually connected to the various connectors 33. The electrodes 32 in strip form (not shown) also may be appropriately connected, as by screws, to this conduit wall portion. Other types of expedients for facilitating the removal or positioning of the electrodes 32 on the conduit wall will be obvious to those skilled in the art.

We claim:

1. An electromagnetic flow meter for measuring the flow of an electrically conductive fluid through a pipe comprising, at least one electrical current-carrying coil mounted outwardly of the pipe bore for generating a magnetic field transverse to the direction of fluid flow, a plurality of electrodes mounted in the pipe opposite one another for producing an electrical signal of magnitude proportional to the velocity of the fluid flow through an electrode plane transverse to said flow direction and including said electrodes, the shape and dimensions of said coil and the shape and dimensions of said electrodes being selected to satisfy at each point in said electrode plane the equation $(W_y B_x - W_x B_y) = K$; wherein $K$ is of substantially constant value and wherein the indices $x$ and $y$ represent mutually orthogonal vector components directed substantially parallel to an axis passing through said electrodes and substantially parallel to the direction of the magnetic field, respectively, of a weighting factor W and of a magnetic field density B.

2. An electromagnetic flow meter according to claim 1, wherein the shapes and dimensions of both said electrodes and said coil is chosen so that the value of the factor $(W_y B_x)$ is as small as possible.

3. A flow meter according to claim 1 which comprises two current-carrying coils mounted opposite each other exteriorly of said pipe for generating said magnetic field.

4. A flow meter as claimed in claim 3 wherein said pipe has a circular cross section and wherein each said electrode comprises an arcuate sector conforming to an interior wall portion of said pipe.

5. A flow meter as claimed in claim 4 wherein said pipe has a circular cross section and wherein each said electrode comprises an arcuate sector conforming to an interior wall portion of said pipe, the interior surface dimension of said sector along the arc of curvature thereof being proportional to the internal radius of said pipe.

6. A flow meter as claimed in claim 3 wherein said pipe has a circular cross section and wherein each said electrode comprises an arcuate sector conforming to an interior wall portion of said pipe; each said sector having an arc of curvature substantially equal to the internal radius of said pipe, and further wherein said coils comprise a matched pair of coils of rectangular configuration.

7. A flow meter according to claim 1, wherein each of said electrodes comprises an array of discrete metallic elements mounted adjacent one another and electrically connected in parallel to an electrode output terminal.

8. The electromagnetic flow meter as claimed in claim 1, which further comprises, a source of time-varying signal coupled to said coils, the frequency of said signal being different than 60Hz., and means coupled to the signal source and synchronized to the frequency of said signal for synchronously receiving the signal output of said electrodes.

9. An electromagnetic flow meter for measuring the flow of an electrically conductive fluid through a pipe comprising, a pair of electrical current-carrying coils of regular geometrical shape mounted opposite one another outwardly of the pipe bore for generating a magnetic field transverse to the direction of fluid flow, a pair of electrodes mounted on the internal wall of said pipe opposite one another and defining therebetween an electrode plane which includes said magnetic field, said electrodes producing an electrical signal of magnitude proportional to the velocity of the fluid flow through said electrode plane, the interior surfaces of said electrodes having at least one dimension greater than the respective distances from the geometrical center of said pipe to said electrode surfaces, the dimensions of said coils being such as to follow the equation $(W_y B_x - W_x B_y) = K$ at each point in said electrode plane; wherein $K$ is of substantially constant value, and wherein the indices $x$ and $y$ represent mutually orthogonal vector components oriented substantially parallel to an axis intersecting opposed ones of said electrodes and substantially parallel to the direction of the magnetic field, respectively, of a weighting factor W and of a magnetic field B.

10. The flow meter as claimed in claim 9 wherein said one dimension is the electrode dimension parallel to the direction of fluid flow.

11. The flow meter as claimed in claim 9 wherein said pipe has a circular cross section and wherein said interior electrode surfaces are concave sectors located equal distances from the center of said pipe.

12. The flow meter as claimed in claim 9 wherein said electrode surfaces are of overall rectangular shape with the largest dimension thereof parallel to the direction of fluid flow.

13. The flow meter as claimed in claim 12 wherein said coils are of flat rectangular shape.

14. The flow meter as claimed in claim 9 wherein one of said electrodes is comprised of plural juxtaposed electrically conductive elements, and electrical circuit means for connecting the elements in parallel to a common electrode output terminal.

15. The flow meter as claimed in claim 14 wherein each of said elements comprises a point electrode.

16. The flow meter as claimed in claim 14 wherein each of said elements comprises an elongated electrically conductive strip.